Patented Nov. 8, 1949

2,487,179

UNITED STATES PATENT OFFICE 2,487,179

ORGANIC COMPOUNDS

Edward A. Prill, Yonkers, N. Y., assignor to Boyce Thompson Institute for Plant Research, Inc., a corporation of New York No Drawing. Application August 23, 1946,
Serial No. 692,709

7 Claims. (Cl. 167—33)

This invention relates to organic compounds and has for its object the provision of new organic compounds and insecticidal compositions comprising such compounds and a method of producing the compounds. The new compounds of my invention are N-acylated-C-alkylated piperidines, the acyl radical being the radical of piperic acid or an acid stereoisomeric with piperic acid. The compounds are represented by the formula:

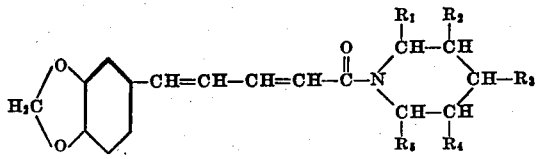

in which $R_1$, $R_2$, $R_3$, $R_4$, and $R_5$ each represent hydrogen or an alkyl radical containing not more than six carbon atoms, not more than four of the R's being hydrogen and not more than four of the R's being an alkyl radical, the sum of the carbon atoms not exceeding 10.

The alcohol extracts of black pepper including piperine

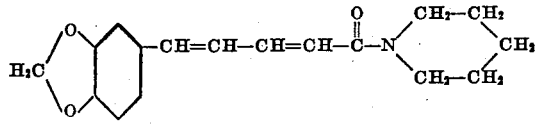

and chavicine, a stereoisomer of piperine, are effective insecticides. They have serious disadvantages, however, for certain uses, as in rooms, because of their irritation of the eyes and nasal passages of humans, and are relatively difficult to dissolve or emulsify in commonly used solvents for insecticides. The compounds of this invention are particularly useful for insecticides since they are non-irritating to sensitive human tissue, are synergistic with pyrethrins, have good solubility in organic liquids commonly used for insecticides and do not crystallize at ordinary temperatures of storage and use, can be prepared efficiently with recovery of valuable by-products, and have no objectionable odor.

The compounds of my invention may be prepared by synthesis using as intermediates C-alkylated-piperidine and piperic acid or acids stereoisomeric therewith or salts of such acids, said acids or salts of said acids being obtainable by hydrolysis of piperine and stereoisomers thereof and extracts, such as alcohol extracts of black pepper and other spices.

C-alkylated piperidine intermediates, such as 2-methylpiperidine, may be obtained commercially. Other individual C-alkylated-piperidines and mixtures of such C-alkylated-piperidines may be made by reduction with metallic sodium and absolute alcohol of commercial alkylated-pyridines, alkenylated pyridines, and mixtures such as coal tar base fractions containing mixtures of such alkylated-pyridines. Reductions may be effected by any other suitable method, such as reduction with hydrogen in the presence of a catalyst, and electrolytic reduction. After reduction of coal tar base fractions, the reduced product may often be advantageously subjected to re-fractionation in order more completely to remove quinoline, isoquinoline, toluidines, and their derivatives. The following materials are among those that may be used as C-alkylated-piperidine:

Hydrogenated pyridine bases. The term "pyridine bases," as used herein, denotes a class of compounds structurally characterized as pyridine having any of its hydrogen atoms individually replaced by any non-aromatic hydrocarbon radicals and excludes pyridine itself. The pyridine bases, the hydrogenation products of which may be used, include the picoline, lutidine and collidine fractions, the still more highly methylated pyridine fraction, and any mixture of these fractions obtainable from coal tar bases, bone oil, by-products of the processing of petroleum and oil-bearing shales, and like sources; also these may be other pyridine bases, such as those producible from certain components of the above pyridine base fractions of primary origin by increasing the size of a substituent. As illustration of increasing the size of a substituent, a methyl radical in the 2, 4, or 6 position of a pyridine nucleus may be converted into an alkyl radical of larger size through reaction with an alkyl halide and sodamide, or into an alkenyl radical of larger size through reaction with an alkenyl halide and sodamide.

Piperic acid was obtained by hydrolysis of pure piperine and converted into piperoyl chloride which was in turn reacted with C-alkylated-piperidines; all steps of the process being according to present standard laboratory methods. In later paragraphs are described a new and improved process for effecting such syntheses.

Individual N-piperoyl-C-alkylated-piperidines were prepared by the interaction of 1 mole of piperoyl chloride and 2 moles of a C-alkylated-piperidine in benzene solution. The products consisting of mixtures of N-piperoyl-C-alkylated-piperidines were made by the interaction of 1 mole piperoyl chloride and the approximate equivalent of 1 mole of a C-alkylated-piperidine mixture in benzene solution in contact with 10% aqueous potassium hydroxide under the conditions of a Schotten-Baumann reaction. In each case the benzene solution of the product was washed successively with aqueous potassium hydroxide, dilute hydrochloric acid, and water. On evaporation of the benzene solvent the product was in each case obtained as a viscous oil. A few of the individual N-piperoyl-mono-C-alkylated-piperidines tended to solidify slowly, but all of the other products remained non-crystalline.

The products were tested against houseflies (Musca domestica) by the Peet-Grady method ("Blue Book," pages 177–181, MacNair-Dorland Co., New York, 1939). The spray solutions were prepared by dissolving the test material in "Deo-base," a purified kerosene type solvent, or, when necessary, in a mixture of "Deo-base" and not more than 5% of acetone as a co-solvent. Any other suitable co-solvent may be used when necessary or desirable.

The N-piperoyl derivatives of those C-alkylated-piperidines which contained three or more carbon atoms in side chain structure on the piperidine ring did not require any co-solvent. Piperine and the new insecticides were found to be similar in regard to the type of action on houseflies. The new compounds exhibit synergistic action with pyrethrum, both in respect to killing power and also in respect to knockdown power.

The insecticidal active principle of pyrethrum comprises several closely related chemical compounds known as pyrethrins. When a solution in "Deo-base" containing 0.025 g. pyrethrins per 100 ml. was tested under the conditions of the Peet-Grady method, the 24-hour kill was only about 20% and the 10-minute knockdown was only about 85%. Table I shows the results obtained when solutions containing a new insecticide of this invention and 0.025 or 0.0125 g. of added pyrethrins per 100 ml. were so tested.

Control tests of solutions containing piperine plus pyrethrum were usually performed with each culture of flies used in order to compare the activity of the new insecticides with that of piperine. It is apparent from the data that the new insecticidal products are very effective.

For the determination of the presence or absence of the property of causing irritating or burning sensations each spray solution was tested by spraying the solution with an atomizer in such a manner that the droplets of spray entered the human nose, mouth, throat and eyes. The results of these are also included in Table I. Some of the products which had been made from mono-methyl-piperidines, or from mixtures containing substantial amounts of mono-methyl-piperidines, gave a very slight irritating or burning sensation when so tested, but the degree was such that it would not occasion discomfort in the normal manner of application of the solution for combating insects. This slight effect probably is attributable to the fact that the separation of pyridine from mono-methyl-pyridine is often not absolutely complete by the ordinary commercial methods; consequently any trace of pyridine present was subsequently reduced to piperidine and then converted into piperine during the course of the preparation of these particular specimens. The solutions of the other insecticidal products gave no detectable indication of irritating or burning sensation.

It is particularly desirable to use a mixture of C-alkylated piperidines for the purpose of economy because mixtures of compounds are most easy to obtain from coal tar bases, and also for the purpose of insuring that the insecticidal product will be non-crystallizing.

In connection with my investigations for the production of compounds of the invention from extracts, I made certain significant discoveries which result in a relatively economic production of the compounds.

It requires considerable effort to isolate piperine from the other constituents of pepper extract. These other constituents include gummy and resinous materials, and also the highly odorous essential oil of black pepper.

The following example illustrates this aspect of my new and improved process for producing the compounds:

Two hundred ml. of 95% ethyl alcoholic solution containing 15 g. of potassium hydroxide and the material extracted by the alcohol from 500 g. of ground black pepper was boiled under a reflux for 7 hours. After cooling to room temperature, the crystalline, relatively insoluble precipitate of potassium piperate was filtered off and washed with 95% ethyl alcohol. The filtrate and washings were combined and saved and will be referred to later herein as "secondary pepper substance." Potassium piperate has the desirable combination of properties of being insoluble in alcohol and having a type of crystal structure which makes it very easy to filter, wash and dry. In addition, its type of crystal structure is such that even in the solid form it can be readily attacked by certain reagents such as thionyl chloride. Twenty grams of dry potassium piperate were obtained in the above experiment and was of sufficient purity for use in the next step.

To a suspension of 12.8 g. (0.05 mole) of the above obtained potassium piperate in 75 cc. of benzene, 6 g. (0.05 mole) of thionyl chloride was added. The reaction started immediately, giving off heat. External heat was applied to the reaction mixture to keep it gently refluxing for 3 hours. The result of the reaction was that piperoyl chloride was present in benzene solution, potassium chloride was a precipitate, and sulfur dioxide had been liberated as a gas. In place of using benzene as the reaction medium in this step, other aromatic hydrocarbons such as toluene, xylene, cumene and p-cymene and mixtures containing any of these and a minor fraction of paraffinic hydrocarbon may be used. In view of the fact that the liquid reaction medium used in this step may eventually be conveniently retained with the final product in the form known to the trade as a "concentrate of the insecticidal substance" the choice of a suitable solvent for the "concentrate" may be made at this stage. After cooling, 14 g. (0.1 mole) of 2,4,6-trimethyl-piperidine were added and allowed to react several hours in a warm place. The reaction mixture was then washed successively with aqueous NaOH, diluted HCl, and water, then dried over $Na_2SO_4$, filtered, and the benzene evaporated. The product, N-piperoyl-2,4,6-trimethylpiperidine, was obtained in a yield of 10 g. The Schotten-Baumann type of reaction may be used for this last step.

It is apparent from the foregoing that the new features of the above process are generally applicable, not only for the production of N-piperoyl-C-alkylated-piperidines but also for the production of N-piperoyl derivatives of many amines and piperic esters of many alcohols. Piperic acid could be used in place of potassium piperate in the latter part of the process, but piperic acid of suitable purity is less easily derivable from the pepper extract and piperic acid is less easily filtered, washed and dried.

The secondary pepper substance, in the form of the alcoholic solution previously referred to, was worked up in the following manner. The piperidine which had resulted from the hydrolysis of both the piperine and the chavicine of the pepper extract, and the alcoholic solvent were removed by distillation and the distillate collected. From similarly obtained distillates, I have isolated piperidine of a high degree of purity in the sense of being entirely free of homologous compounds. In practice, also the alcohol contained in the distillate may be recovered and recycled. The distillation residue of the secondary pepper substance was diluted with water filtered and strongly acidified with HCl, whereupon an oily organic acidic substance was precipitated. This oily acidic substance, hereinafter referred to as "secondary pepper acidic substance," which consisted largely of acidic matter steroisomeric with piperic acid such as chavicinic acid and isochavicinic acid was separated and was used to N-acylate 2,4,6 - trimethylpiperidine; the method used being analogous to the method which I had previously used for obtaining the stereoisomeric piperoyl-2,4,6-trimethylpiperidine from piperic acid through piperoyl chloride. The N-acylated-2,4,6-trimethylpiperidine being acylated by the secondary pepper acidic substance, and being a substance coming within the scope of this invention, was found to weigh 5 g. and it was found to give the results shown in Table II when tested for effect on houseflies and for the effect of causing irritation to humans by the previously described test methods.

In place of black pepper (*Piper nigrum L*), other species of the Piperaceae which contain a substance hydrolyzable to piperic acid, or to an acid stereoisomeric therewith, may be used. Also residues left from the isolation of the essential oil of such species may be used and also parts of such species that are unacceptable to the spice, drug or food trade because of low flavor, off-flavor, damage, contamination, and the like. As a medium for the reaction of the plant extract with potassium hydroxide, I have found it is possible to obtain potassium piperate in suitable form by using methyl, ethyl, or isopropyl alcohol, or any of these alcohols mixed with a minor quantity (not more than 25%) of water. The plant material may be extracted with any other solvent capable of extracting piperine or a stereoisomer thereof, piperic acid or a stereoisomer thereof, or a substance hydrolyzable to piperic acid or to an acid steroisomeric therewith, the extraction solvent removed and extractive matter dissolved in the alcoholic solution.

Also for the purpose of separating an insoluble salt of piperic acid from other constituents of alkali treated plant extractive matter, sodium hydroxide may be used in place of potassium hydroxide. However, I found that sodium piperate is less easily filtered, washed and dried than is potassium piperate. Also I found that sodium piperate reacts only to a slight extent with thionyl chloride under the above-described conditions under which potassium piperate reacts very readily to form piperoyl chloride.

It is contemplated that the greater part of the pyrethrum now used, as in DDT compositions, may be replaced by new compounds of this invention without causing reduction of knockdown or killing powder.

Table I

| Culture | Compound N-Piperoyl derivative of | Compound g. per 100 ml. | Pyrethins Added g. per 100 ml. | 24-hr. Kill Per Cent | 10-min. Knockdown Per Cent | Irritating or Burning Effect of Spray to Humans |
|---|---|---|---|---|---|---|
| A | Control (Piperine) | 0.1 | 0.0125 | 64 | 99 | Very strong. |
|   | do | 0.05 | 0.025 | 66 | 99 | Do. |
|   | 2-Methylpiperidine | 0.1 | 0.0125 | 67 | 98 | Very slight. |
|   | do | 0.05 | 0.025 | 64 | 99 | Do. |
| B | Control (Piperine) | 0.1 | 0.0125 | 51 | 98 | Very strong. |
|   | 3-Methylpiperidine | 0.1 | 0.0125 | 47 | 98 | None. |
|   | 4-Methylpiperidine | 0.1 | 0.0125 | 56 | 99 | Very slight. |
|   | 2-Amylpiperidine | 0.1 | 0.0125 | 53 | 99 | None. |
|   | 4-Amylpiperidine | 0.1 | 0.0125 | 50 | 98 | Do. |
| C | Control (Piperine) | 0.1 | 0.0125 | 70 | 99 | Very strong. |
|   | Pyridine bases of distilling range 125 to 145° C. hydrogenate of the hexahydro stage | 0.1 | 0.0125 | 66 | 99 | Very slight. |
|   | 2,4,6-Trimethylpiperidine | 0.1 | 0.0125 | 75 | 99 | None. |
|   | 2,6-Dimethylpiperidine | 0.1 | 0.0125 | 69 | 100 | Do. |
| D | Control (Piperine) | 0.05 | 0.025 | 78 | 100 | Very strong |
|   | 2,4,6-Trimethylpiperidine | 0.05 | 0.025 | 87 | 100 | None. |
|   | 2,6-Dimethylpiperidine | 0.05 | 0.025 | 80 | 100 | Do. |
| E | Control (Piperine) | 0.1 | 0.0125 | 52 | 99 | Very strong. |
|   | 2,4-Dimethylpiperidine | 0.1 | 0.0125 | 62 | 99 | None. |
|   | 2-Ethylpiperidine | 0.1 | 0.0125 | 52 | 96 | Do. |
| F | Refined mixed Picolines; maximum distilling range of 3° C., 2 to 97% between 141 and 145° C., hydrogenated to the hexahydro stage | 0.1 | 0.0125 | 54 | 99 | Very slight. |
|   | 2,4,6-Trimethylpiperidine | 0.1 | 0.025 | 92 | 99 | None. |
|   | 2,6-Dimethylpiperidine | 0.1 | 0.025 | 91 | 100 | Do. |
|   | 2,3-Dimethylpiperidine | 0.1 | 0.025 | 88 | 98 | Do. |
| G | | 0 | 0.1 | 49 | 99 | |
|   | | 0 | 0.025 | 13 | 88 | |
|   | Control (Piperine) | 0.4 | 0 | 40 | 87 | Very strong. |
|   | 2,4,6-Trimethylpiperidine | 0.4 | 0 | 42 | 94 | None. |
|   |  | 0.2 | 0.0125 | 54 | 99 | Do. |
| H | | 0 | 0.1 | 41 | 97 | |
|   | Control (Piperine) | 0.1 | 0.0125 | 44 | 98 | Very strong. |
|   | Crude Collidine | 0.4 | 0 | 54 | 84 | None. |
|   | Fraction; distilling range 157 to 170° C., hydrogenated to the hexahydro stage | 0.2 | 0.0125 | 58 | 97 | Do. |
|   |  | 0.1 | 0.0125 | 41 | 98 | Do. |

Table II

| Compound | Compound g. per 100 ml. | Pyrethrins added g. per 100 ml. | 24-hr. Kill, per cent | 10-Min. Knockdown, per cent | Irritating or Burning Effect of Spray to Humans |
|---|---|---|---|---|---|
| Control (Piperine) | 0.1 | 0.0125 | 52 | 99 | Strong. |
| Product prepared from "secondary pepper acidic substance" and 2,4,6-trimethylpiperidine | 0.2 | 0.0125 | 50 | 98 | None. |

I claim:
1. A compound represented by the formula:

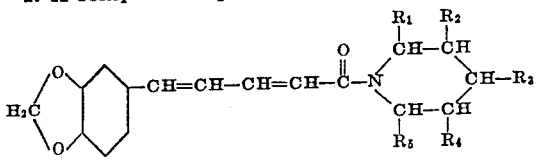

in which $R_1$, $R_2$, $R_3$, $R_4$, and $R_5$ are each represented by a member of the group consisting of hydrogen and an alkyl radical containing not more than six carbon atoms, not more than four of the R's being hydrogen and not more than four of the R's being an alkyl radical, the sum of the carbon atoms not exceeding 10.

2. A compound as in claim 1 wherein one member of the group consisting of $R_1$, $R_2$, $R_3$, $R_4$, and $R_5$ is a methyl radical and the other members are each hydrogen.

3. A compound as in claim 1 wherein two members of the group consisting of $R_1$, $R_2$, $R_3$, $R_4$, and $R_5$ are each methyl radicals and the other members are hydrogen.

4. A compound as in claim 1 wherein three members of the group consisting of $R_1$, $R_2$, $R_3$, $R_4$, and $R_5$ are each a methyl radical and the other members are each hydrogen.

5. A compound as in claim 1 wherein one member of the group consisting of $R_1$, $R_2$, $R_3$, $R_4$, and $R_5$ is an amyl radical and the other members are each hydrogen.

6. An insecticidal composition containing as an essential active ingredient free from the property of causing uncomfortable irritation to human tissue under the conditions of normal use, an organic compound represented by the formula:

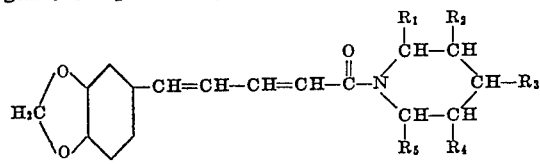

in which $R_1$, $R_2$, $R_3$, $R_4$, and $R_5$ are each represented by a member of the group consisting of hydrogen and an alkyl radical containing not more than six carbon atoms, not more than four of the R's being hydrogen and not more than four of the R's being an alkyl radical, the sum of the carbon atoms not exceeding 10 in solution in a petroleum distillate.

7. A method of preparing an organic compound which comprises reacting thionyl chloride in a medium consisting of an inert liquid hydrocarbon of the benzene series and producing piperoyl chloride, mixing with the piperoyl chloride organic basic matter of the piperidine series represented by the formula:

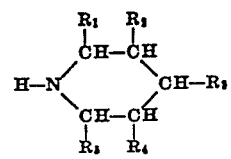

in which $R_1$, $R_2$, $R_3$, $R_4$, and $R_5$ each represent hydrogen or an alkyl radical containing not more than six carbon atoms, not more than four of the R's being hydrogen and not more than four of the R's being an alkyl radical, the sum of the carbon atoms not exceeding 10, and freeing from the solution the produced N-piperoyl derivative of the organic basic matter of the piperidine series.

EDWARD A. PRILL.

REFERENCES CITED

The following references are of record in the file of this patent:

UNITED STATES PATENTS

| Number | Name | Date |
|---|---|---|
| 1,957,674 | Schrauth | May 8, 1934 |
| 2,126,329 | Hoffer | Aug. 9, 1938 |
| 2,127,879 | Martin | Aug. 23, 1938 |
| 2,317,286 | Martin et al. | Apr. 20, 1943 |
| 2,326,350 | Gertler | Aug. 10, 1943 |
| 2,347,723 | Wenner | May 2, 1944 |
| 2,362,128 | Gertler | Nov. 7, 1944 |
| 2,368,006 | Cusic | Jan. 23, 1945 |
| 2,431,844 | Synerholm | Dec. 2, 1947 |

OTHER REFERENCES

McElvain: Jour. Amer. Chem. Soc., vol. 68, page 2596 (1946).

Standinger et al.: Chem. Abstracts, vol. 17, pages 2581–2582 (1923).

Rugheimer: Ber. der. Deu. Chem., vol. 15, pages 1390–1391 (1882).

Schaltz: Ber. der. Deu. Chem., vol. 28, pages 1495–1497 (1895).

Caseneux et al.: Bull. Soc. Chim., vol. 27, page 291 (1877).

Henry: Plant Alkaloids, J. & A. Churchill, London, pages 35–37 (1913).

Pictet-Biddle: Vegetable Alkaloids, Wiley & Sons, N. Y., pages 143–144 on 147–8 (1913).

Trier-Winterstein: Die Alkaloide, Edwards Bros. Inc., Ann Arbor, Mich., pages 268–271 (1943).

Synerholm et al.: Boyce-Thompson Inst., 13, pages 433–442 (1945).

Beilstein, vol. XX, pages 95, 99, 101, 104, 106, 108, 109, 110, 116, 119, 120, 121, 124, 125, 126, 129, and 132.

Harvill et al.: "Toxicity of Piperine Solutions to Houseflies," Boyce-Thompson Inst., vol. 13, No. 2, Apr.–June 1943, pages 87–92.

Certificate of Correction

Patent No. 2,487,179                                              November 8, 1949

EDWARD A. PRILL

It is hereby certified that errors appear in the printed specification of the above numbered patent requiring correction as follows:

Column 6, line 33, for the word "powder" read *power*; column 7, line 54, after "reacting" insert *equimolar quantities of the dry potassium piperate and*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*